United States Patent

[11] 3,589,649

| [72] | Inventors | Jacques Leclercq;<br>Claude Victor, both of Saint-Leu-la-Foret, France |
|------|-----------|------|
| [21] | Appl. No. | 856,561 |
| [22] | Filed | Sept. 10, 1969 |
| [45] | Patented | June 29, 1971 |
| [73] | Assignee | Societe National D'Etude Et De Construction De Moteurs D'Aviation Paris, France |
| [32] | Priority | Sept. 10, 1968 |
| [33] |  | France |
| [31] |  | 165708 |

[54] STRUTS FOR RETRACTABLE AIRCRAFT UNDERCARRIAGES
9 Claims, 5 Drawing Figs.

[52] U.S. Cl. .................................................. 244/102
[51] Int. Cl. .................................................. B64c 25/14
[50] Field of Search .................................... 244/102, 101, 100, 103

[56] References Cited
UNITED STATES PATENTS

| 2,959,381 | 11/1960 | Hartel | 244/102 |
| 3,514,057 | 5/1970 | Biggs | 244/102 |

FOREIGN PATENTS

| 463,739 | 4/1937 | Great Britain | 244/102 |

Primary Examiner—Milton Buchler
Assistant Examiner—Paul E. Sauberer
Attorney—Larson and Taylor ABSTRACT: A retractable undercarriage strut for an aircraft tricycle undercarriage includes a bracing arm for ensuring the rigidity of the strut. A stay assembly of special construction and an extensible strutting element provides for efficient retractability and rigidity of the strut.

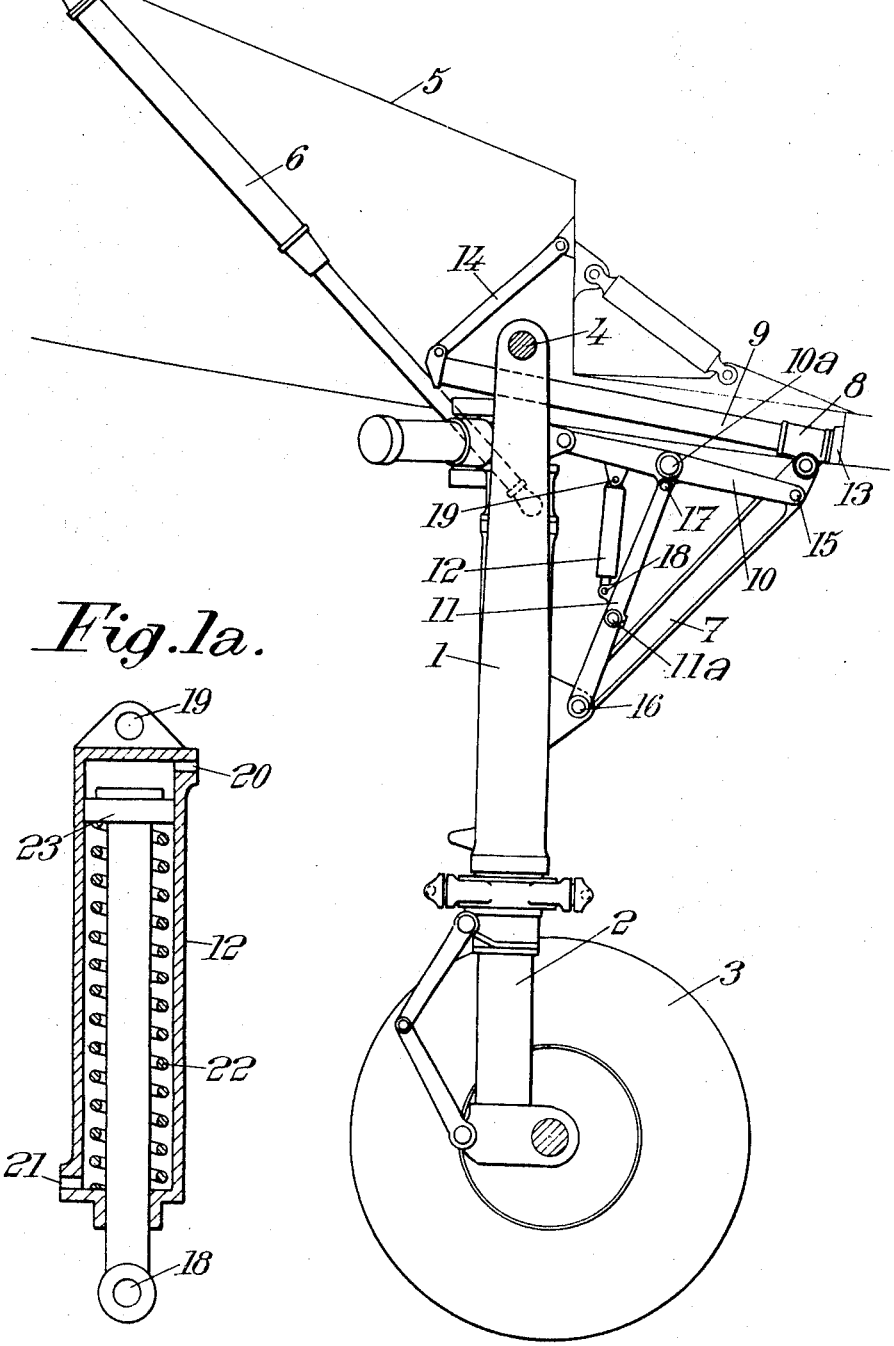

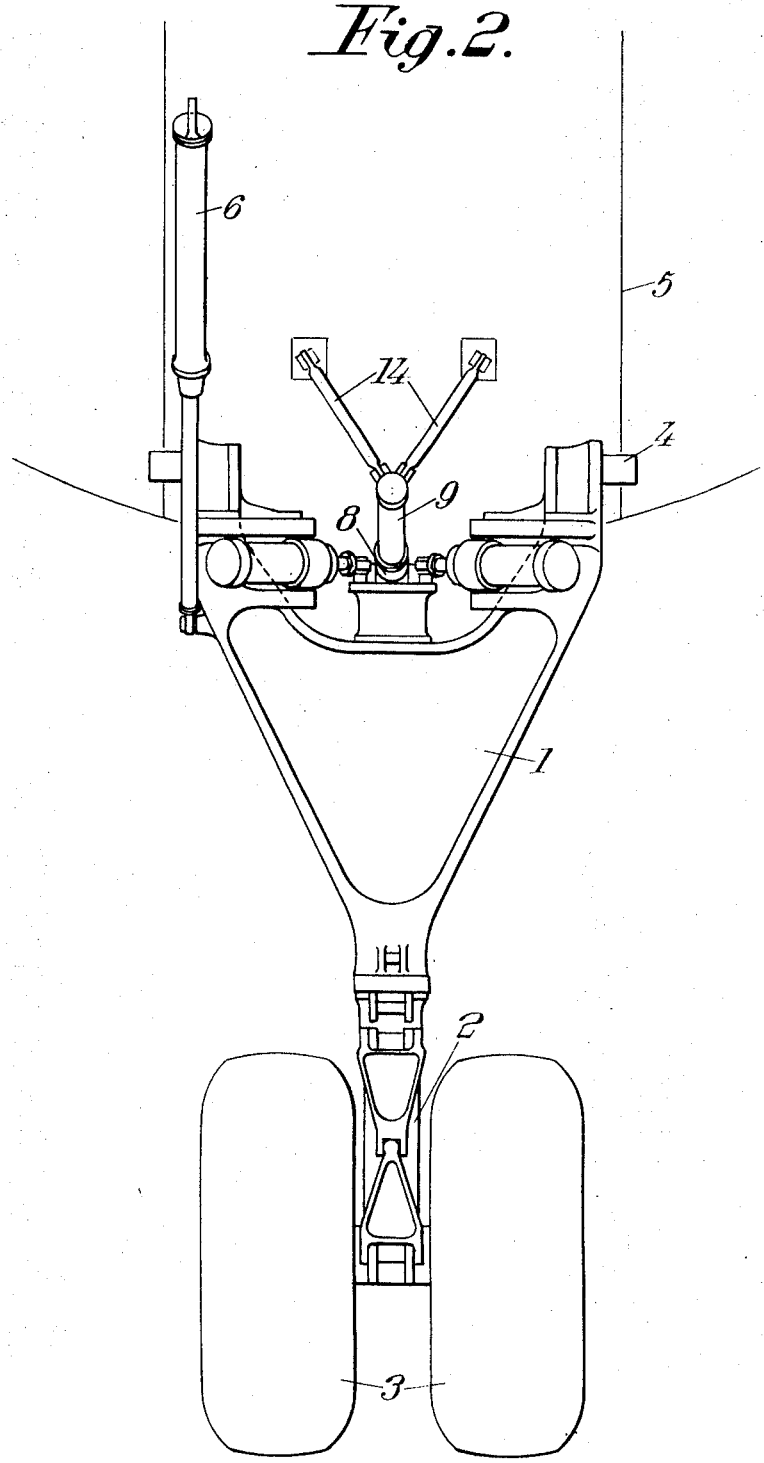

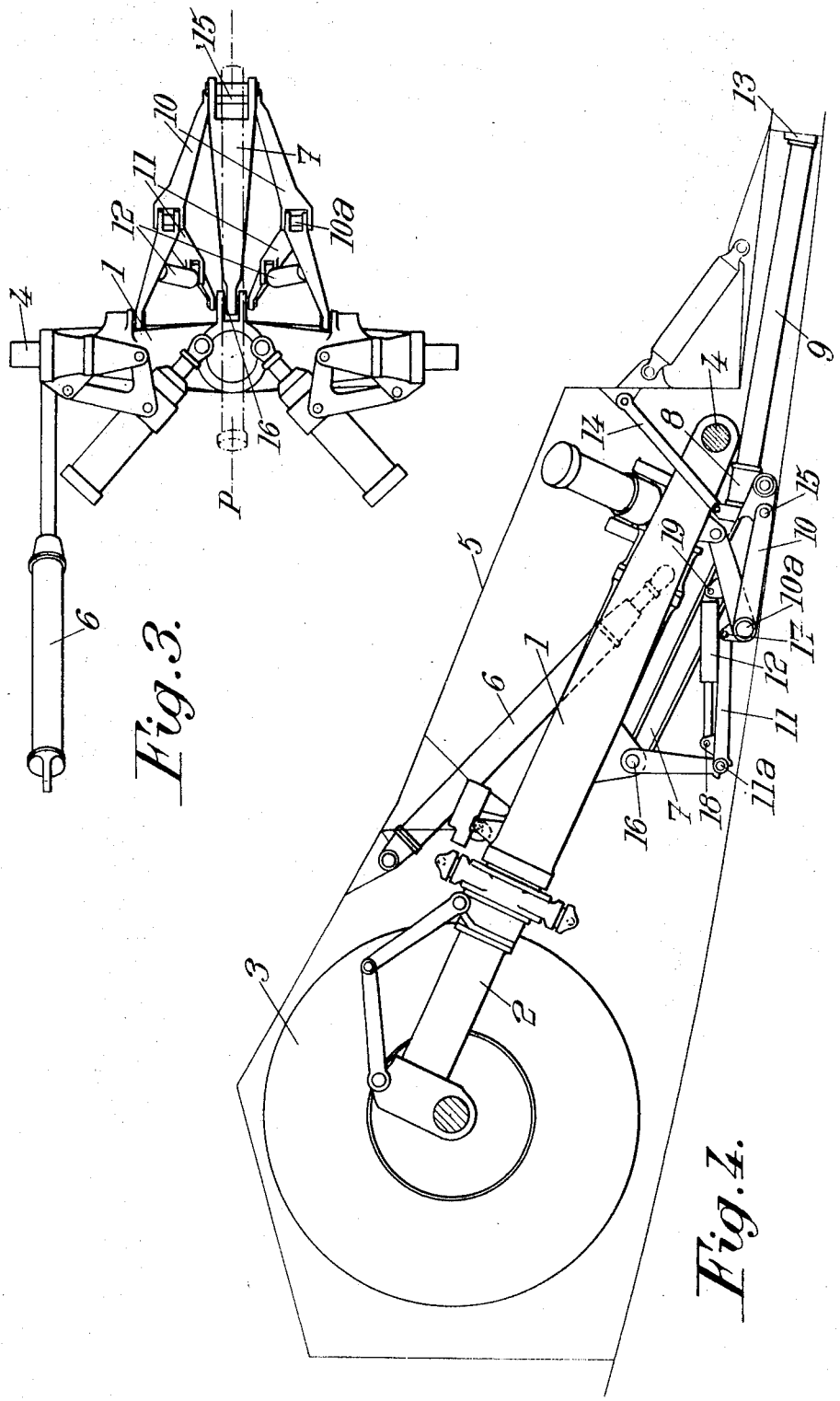

STRUTS FOR RETRACTABLE AIRCRAFT UNDERCARRIAGES

The invention relates to struts for retractable aircraft undercarriages.

The invention relates more particularly, since this seems to be its most advantageous, but not exclusive application, to front retractable struts for tricycle undercarriages adapted for aircraft, inter alia high capacity transport aircraft.

It is an object of the invention to provide a robust undercarriage which is very reliable in operation and exerts low reaction forces on the aircraft.

Before describing the main feature of the invention, it will be advantageous to define precisely the meaning of the expression "folding link" used hereinafter in the definition of such main feature; this expression means what might be termed "a pair of compasses" comprising two arms (single or double) which are articulated to one another by one of their ends and whose free ends are articulated respectively to two structural elements to be connected, the "operative" position of the "pair of compasses" being the one in which its two arms are in continuation of one another—i.e., form an angle of 180°—while the other positions of the "pair of compasses," in which its two arms form an angle differing from 180°, are termed "folded" positions.

The undercarriage strut according to the invention comprises a column (bearing a running gear at its lower end) which is articulated by its other end, around a transverse axis, to the aircraft structure so that the column can be retracted forwardly, via the agency of suitable drive means, by a pivoting movement around its axis of articulation, the rigidity of the strut assembly in the lowered position being ensured by a bracing means interposed, to the rear of the column, between the latter and the aircraft structure, the strut being characterized in that the bracing means if formed by:

An inclined bracing arm which is articulated by its lower end to the column and by its upper end to a slide adapted to be displaced along a longitudinal guide unitary with the aircraft structure, between a rear end position corresponding to the lowered position of the strut and a forward end position corresponding to the raised position of the strut;

A main stay formed by a "folding link" which connects, towards their upper ends, the column and the inclined bracing arm, the main stay being adapted, in the operative position, to retain the slide in the rear end position;

An auxiliary stay formed by a "folding link" interposed between the main stay and the column of the strut, the auxiliary stay being adapted, in the operative position, to retain the main stay in the operative position;

And a controlled extensible strutting element which is interposed between the main stay and the auxiliary stay and is adapted, in one of its end positions, to lock the main stay and the auxiliary stay in the operative position, while allowing, and even encouraging, the folding of the stays as soon as the strutting element is moved away from said end position.

In any case, the invention will be clearly understood from the following description thereof with reference to the accompanying drawings; the description and drawings relate to a preferred embodiment of the invention but are, of course, nonlimitative.

FIG. 1 is a side elevation of a front strut for an undercarriage constructed according to the invention, the strut being shown in the lowered position;

FIG. 1a shows in axial section to an enlarged scale a control jack the outside view of which is shown in FIG. 1;

FIG. 2 shows the same strut as FIG. 1, but in elevation viewed from the front of the aircraft;

FIG. 3 is a plan view of the strut; and

FIG. 4 shows the strut in the same conditions as in FIG. 1, but with the strut retracted.

Referring to FIGS. 1 to 3, an undercarriage strut comprises a column 1 advantageously constructed in the form of a triangular caisson having its base at the top and continued at the bottom by a shock-absorbing device 2 bearing the running gear of the strut, for instance, a pair of coaxial wheels 3.

To make its top end the column 1 is articulated around lowered transverse pivot 4 borne by the aircraft structure 5, control means, such as a retracting jack 6, for instance, being provided to enable the column 1 to be retracted forwardly by a pivoting movement around its articulating pivot 4.

To make sure that the strut assembly is rigid in the lowered position, the strut comprises an interposed bracing device, to the rear of the column 1, between the latter and the aircraft structure 5, the bracing device being constructed in accordance with the main feature of the invention which will now be described in detail.

According to the main feature of the invention, the bracing device is formed by:

An inclined bracing arm 7 which is articulated by its lower end to the column 1 and by its upper end to a slide 8 adapted to be displaced along a longitudinal guide 9 unitary with the aircraft structure 5, between a rear end position corresponding to the lowered position of the strut (FIG. 1) and a forward end position corresponding to the retracted position of the strut (FIG. 4);

A main stay 10 formed by a "folding link" which connects, towards their upper ends, the column 1 and the inclined bracing arm 7, the main stay 10 being adapted, in the operative position, to retain the slide 8 in the rear end position;

An auxiliary stay formed by a "folding link" interposed between the main stay 10 and the column 1 of the strut, the auxiliary stay 11 being adapted, in the operative position, to retain the main stay 10 in the operative position;

And a controlled extensible strutting element 12 which is interposed between the main stay 10 and the auxiliary stay 11 and is adapted, in one of its end positions, to lock the main stay 10 and the auxiliary stay 11 in the operative position, while allowing, and even encouraging, the folding of the stays as soon as the strutting element 12 is moved away from said end position.

The slide 8 is formed by a cylindrical sleeve and the guide 9 is formed by a cylindrical tube attached to the aircraft structure, for instance towards the rear, by fitting into a bearing 13, and towards the front, via two inclined rods 14 of V-shape when viewed from in front, the inclined rods 14 ensuring the lateral stability of the tube.

The main stay 10 is so constructed that the "folding linkage" forming the main stay 10 is double—i.e., as can be clearly seen in FIG. 3, comprises two identical elements, each having two arms, and disposed symmetrically on either side of the longitudinal plane of symmetry P of the aircraft, the two elements being so disposed as to converge rearwardly as far as a common pivot 15 by which they are articulated to the upper end of the bracing arm 7, whose lower end is articulated to the column 1 by an articulating pivot 16.

The auxiliary stay 11 is so constructed that the "folding linkage" forming the auxiliary strut 11 is double—i.e., as shown in FIG. 3, comprises two identical elements, each having two arms, and disposed symmetrically on either side of the longitudinal plane of symmetry P of the aircraft, the two elements being so disposed as to diverge rearwardly and upwardly from a common pivot by which they are articulated to the column 1 (this common pivot advantageously being the articulating pivot 16 by which the bracing arm 7 is articulated to the column 1) as far as two symmetrical elements forming the main stay 10.

Preferably, the articulating pivot 17 by which each constituent element of the auxiliary stay 11 is articulated to the corresponding constituent element of the main stay 10 is disposed adjacent the articulation 10a of the two arms forming the said main stay element.

The controlled extensible strutting element 12 interposed between the main stay 10 and the auxiliary stay 11 is preferably double, similarly to said stays, and each of the two symmetrical apparatuses forming the strutting element can advantageously be formed by a hydraulic jack.

Preferably, the hydraulic jack is articulated by one of its ends to a pivot 18 disposed adjacent the articulating pivot 11a of the corresponding auxiliary stay element 11 and, by its other end, to a pivot 19 disposed in a central zone of the arm closest to the column 1 and belonging to the main stay element disposed on that particular side.

Advantageously, the jack is constructed in the form of a resilient rod having a return force urging the main stay 10 and the auxiliary stay 11 into their operative position (with the undercarriage lowered), in which these two stays are mechanically locked by the jack.

A hydraulic jack of the kind specified can be constructed as shown in FIG. 1a, that is to say the jack barrel 12 (cylinder) has at its ends two apertures for distributing the transmission liquid, one 20 of the apertures, when liquid is supplied thereto, enabling the jack to be extended, such extension corresponding to the folding of the main stay 10 and the auxiliary stay 11, while the other aperture 21, when liquid is supplied thereto, enables the jack to be shortened, such shortening bring the stays into the operative position, the jack also having a spring 22 which is interposed between the piston 23 and the jack barrel 12 and tends to shorten the jack.

Because of the stepdown inherent in the triangular kinetics of the bracing device, it is enough to use a relatively weak spring 22 to produce the locking of the auxiliary stay 11 and therefore the main stay 10 in the operative position. In other words, the undercarriage strut is locked in the extended position merely by the force of the spring 22, without the necessity to maintain the pressure of the liquid which has acted via the aperture 21 to shorten the jack 12.

There is no need to provide any hydraulic sequence between the drive of the lifting jack and the drive of the locking jack 12, since to retract the strut, it is enough to admit the liquid simultaneously under pressure into the two jacks (via the aperture 20 for the locking jack 12) to both unlock the strut (by the folding of the auxiliary stay 11 and the main stay 10) and retract the strut concurrently.

FIG. 4 shows the strut in the retracted position. To lower the strut from the retracted position and lock it in the landing position, it is enough to supply liquid simultaneously to the retracting jack 6 (in the lowering direction) and the locking jack 12 via the aperture 21, the weight of the strut also helping in the performance of this operation.

Consequently, whatever the embodiment adopted may be, the result is a forward strut for a retractable undercarriage which has many real advantages including, inter alia, the following: it is simple and robust; it is reliable in operation, due to the efficiency of the locking of its bracing device when the strut is lowered, the locking means bringing into operation only bars which are articulated at their ends around well protected pivots and are easy to lubricate, excluding any complicated locking member requiring precise machining; not much power is needed to actuate the locking means; the gracing device does not respond to rebound, since the elements of the bracing device are always connected to one another via their articulations; and the forces at the attachment of the bracing arm 7 to the aircraft structure are reduced due to the fact that some of the forces transmitted by the arm are absorbed by the column 1 via the main stay 10, the reaction on the slide 8 being substantially perpendicular to the guide 9— an advantageous feature for the absorption of the force by the framework of the aircraft structure.

Clearly, and as results from the foregoing, the invention is not limited to those methods of application or embodiments of its various members which have been more particularly indicated but, on the contrary, the invention covers all variants.

What we claim is:

1. In a strut for retractable aircraft undercarriages which comprises a column (bearing a running gear at its lower end) which is articulated by its other end, around a transverse axis, to the aircraft structure so that the column can be retracted forwardly, via the agency of suitable drive means, by a pivoting movement around its axis of articulation, the rigidity of the strut assembly in the lowered position being ensured by a bracing means interposed, to the rear of the column, between the latter and the aircraft structure, the improvement that the bracing means is formed by an inclined bracing arm which is articulated by its lower end to the column and by its upper end to a slide adapted to be displaced along a longitudinal guide unitary with the aircraft structure, between a rear end position corresponding to the lowered position of the strut and a forward end position corresponding to the retracted position of the strut; a main stay formed by a "folding link" which connects, towards their upper ends, the column and the inclined bracing arm, the main stay being adapted, in the operative position, to retain the slide in the rear end position; an auxiliary stay formed by a "folding link" interposed between the main stay and the column of the strut, the auxiliary stay being adapted, in the operative position, to retain the main stay in the operative position; and a controlled extensible strutting element which is interposed between the main stay and the auxiliary stay and is adapted, in one of its end positions, to lock the main stay and the auxiliary stay in the operative position, while allowing the folding of the stays as soon as the strutting element is moved away from said end position.

2. The strut specified in claim 1, wherein the slide is formed by a cylindrical sleeve and the guide is formed by a cylindrical tube attached to the aircraft structure, for instance towards the rear, by fitting into a bearing, and towards the front, via two inclined rods of V-shape when viewed from in front, the inclined rods insuring the lateral stability of the tube.

3. The strut specified in claim 1, wherein the main stay is so constructed that the "folding linkage" forming the main stay is double—i.e., comprises two identical elements, each having two arms, and disposed symmetrically on either side of the longitudinal plane of symmetry of the aircraft, the two elements being so disposed as to converge rearwardly as far as a common pivot by which they are articulated to the upper end of the bracing arm whose lower end is articulated to the column by an articulating pivot.

4. The strut specified in claim 1, wherein the auxiliary stay is so constructed that the "folding linkage" forming the auxiliary strut is double—i.e., comprises two identical elements, each having two arms, and disposed symmetrically on either side of the longitudinal plane of symmetry of the aircraft, the two elements being so disposed as to diverge rearwardly and upwardly from a common pivot by which they are articulated to the column, this common pivot advantageously being the articulating pivot by which the bracing arm is articulated to the column as far as two symmetrical elements forming the main stay.

5. The strut specified in claim 1, wherein the articulating pivot by which each constituent element of the auxiliary stay is articulated to the corresponding constituent element of the main stay is disposed adjacent the articulation of the two arms forming the said main stay element.

6. The strut specified in claim 1, wherein the controlled extensible strutting element is double, and each of the two symmetrical apparatuses forming the double strutting element is formed by a hydraulic jack.

7. The strut specified in claim 6, wherein the hydraulic jack is articulated by one of its ends to a pivot disposed adjacent the articulating pivot of the corresponding auxiliary stay element and, by its other end, to a pivot disposed in a central zone of the arm closest to the column and belonging to the main stay element disposed on that particular side.

8. The strut specified in claim 7, wherein the jack is constructed in the form of a resilient rod having a return force urging the main stay and the auxiliary stay into their operative position (with the undercarriage lowered), in which these two stays are mechanically locked by the jack.

9. The strut specified in claim 8, wherein the jack comprises: the jack barrel, having at its ends two apertures for distributing the transmission liquid, one of the apertures, when supplied with liquid, enabling the jack to be extended such extension corresponding to the folding of the main stay and the auxiliary stay, while the other aperture, when liquid is supplied thereto, enables the jack to be shortened, such shortening bringing the main stay and the auxiliary stay into the operative position; and a spring, interposed between the piston and the jack barrel, the spring tending to shorten the jack.